US 8,919,860 B2
Dec. 30, 2014

(12) United States Patent
Thiele

(54) SLIDE DOOR MOVEMENT SYSTEM WITHOUT CENTER RAIL

(75) Inventor: Steven R. Thiele, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 13/214,523

(22) Filed: Aug. 22, 2011

(65) Prior Publication Data

US 2013/0047516 A1  Feb. 28, 2013

(51) Int. Cl.
*B60J 5/06* (2006.01)
*B60J 10/08* (2006.01)

(52) U.S. Cl.
CPC .................................. *B60J 5/06* (2013.01)
USPC ............................. 296/155; 49/502

(58) Field of Classification Search
USPC ............ 296/155, 146.7, 146.6, 146.5, 146.2, 296/152, 37.13, 38, 146.12, 146.11; 49/502, 352, 349, 254, 250
See application file for complete search history.

(56) References Cited

U.S. PATENT DOCUMENTS

| | | |
|---|---|---|
| 5,896,704 A | 4/1999 | Neag et al. |
| 5,921,613 A | 7/1999 | Breunig et al. |
| 6,328,374 B1 | 12/2001 | Patel |
| 6,709,045 B2 | 3/2004 | Shuto et al. |
| 6,799,393 B2 | 10/2004 | Stephen |
| 7,104,588 B2 * | 9/2006 | George et al. ............ 296/146.12 |
| 7,267,395 B2 | 9/2007 | Tomozawa |
| 7,430,832 B2 | 10/2008 | Hung |
| 7,610,718 B2 | 11/2009 | Kopish |
| 7,611,190 B1 * | 11/2009 | Elliott et al. .................. 296/155 |
| 7,658,438 B1 | 2/2010 | Elliott et al. |
| 7,703,242 B2 | 4/2010 | Goebel et al. |
| 7,717,493 B2 | 5/2010 | Plavetich |
| 7,798,557 B2 | 9/2010 | Elliott et al. |
| 2005/0116496 A1 * | 6/2005 | Lowson et al. .......... 296/146.11 |
| 2006/0175867 A1 | 8/2006 | Heuel et al. |
| 2007/0085374 A1 * | 4/2007 | Mather et al. ................. 296/155 |
| 2009/0072583 A1 * | 3/2009 | Elliott et al. .................. 296/155 |
| 2009/0315362 A1 | 12/2009 | Michnik et al. |

* cited by examiner

*Primary Examiner* — Glenn Dayoan
*Assistant Examiner* — Sunsurraye Westbrook
(74) *Attorney, Agent, or Firm* — Fay Sharpe LLP

(57) ABSTRACT

An automotive sliding door supported by an upper rail that eliminates the need for a middle rail opening in a vehicle body. The sliding door hangs from an upper guide member or members that support the door along its length in both an open and closed position. The upper guide members support the full weight of the door without a middle rail for support thereby eliminating rail gash in rear quarter panel.

20 Claims, 5 Drawing Sheets

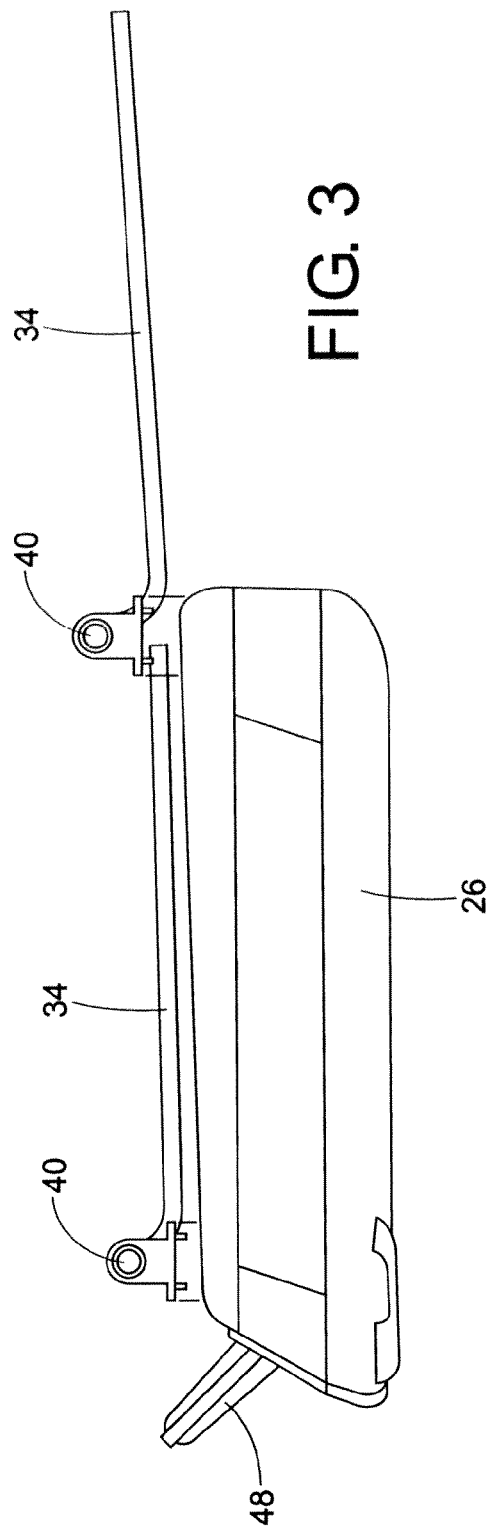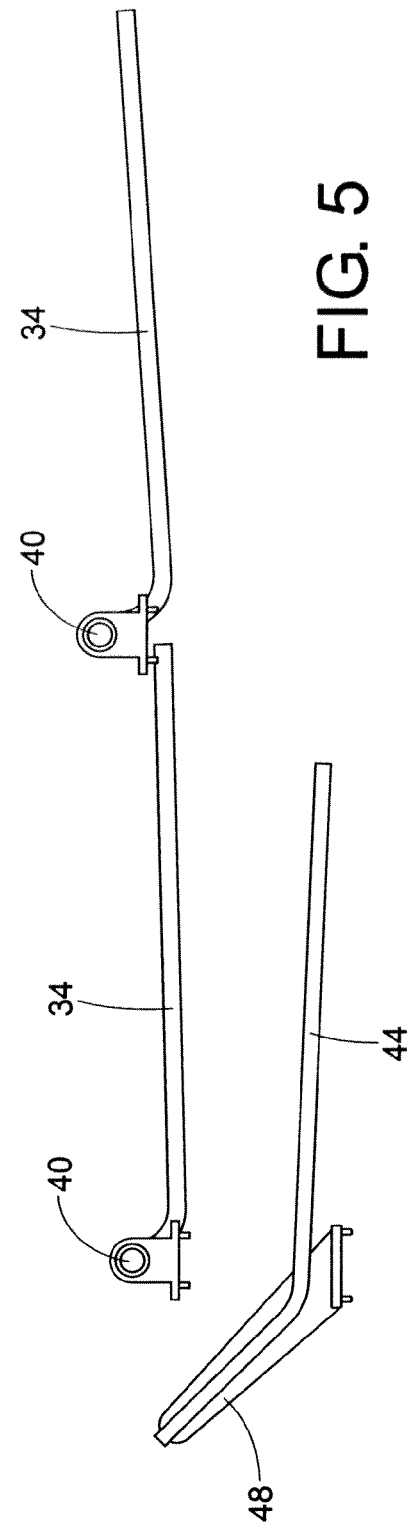

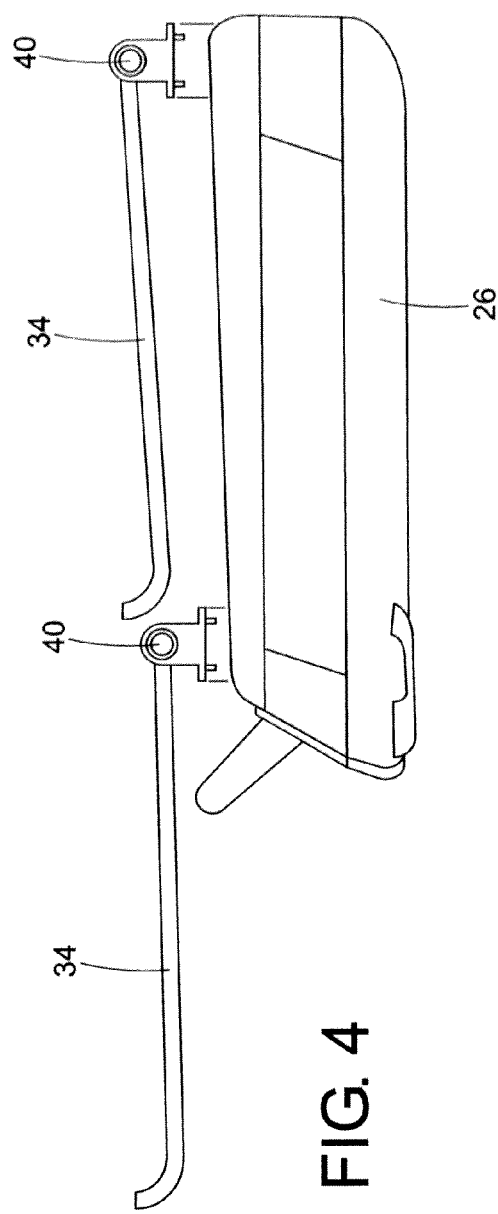
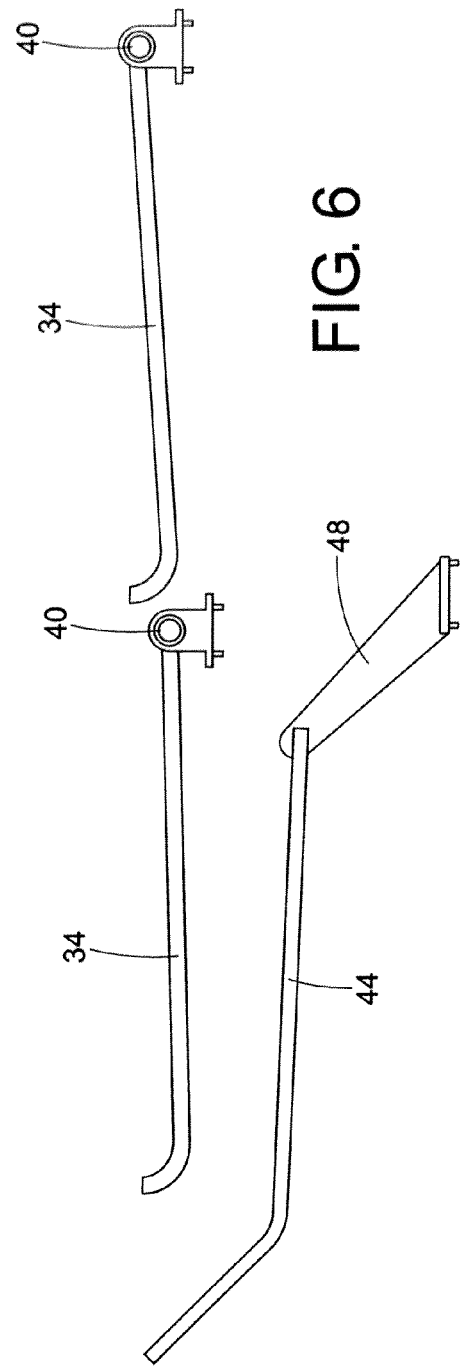
FIG. 4
FIG. 6

SLIDE DOOR MOVEMENT SYSTEM WITHOUT CENTER RAIL

BACKGROUND

The present exemplary embodiment relates to a sliding door assembly. It finds particular application in conjunction with a sliding passenger door for a vehicle, and will be described with particular reference thereto. However, it is to be appreciated that the present exemplary embodiment is also amenable to other like applications.

In conventional vehicles having a sliding door, the door is typically mounted on several slide rails. Typically, upper and lower slide rails are situated, respectively, above and below an opening in a body panel of the vehicle which the door is adapted to provide selective access. A third slide rail, or middle rail, is commonly provided at a vertical position between the upper and lower slide rails, and extends rearwardly from the opening in the body panel of the vehicle. Roller carriages engaged with the slide rails support the door for sliding movement between a closed position and an open position.

During operation of the door, the roller carriages follow the slide rails and thereby guide the door initially outwardly from the side of the vehicle. Once the door is spaced outwardly from the vehicle body, it can then slide parallel to and spaced apart from the body panel as it is advanced rearwardly to its open position. In the open position, the carriage associated with the middle rail supports the weight of the rear portion of the door, while the carriages associated with the upper and lower slide rails support weight of the front portion of the door.

In the past, efforts have been made to reduce the visibility of the middle rail, as some consumers find its presence detracts from the overall appearance of a vehicle. Early attempts at concealing the middle rail included locating the middle rail just below a rear window of the vehicle so that it blends with the window lines. Other approaches have employed covers to conceal the middle slide rail, but still a small gap must remain between the cover and the body for a support arm to connect the door to the roller carriage.

While these attempts to lessen the visual impact of the middle slide rail have been, to some extent, successful in decreasing the size of the middle rail opening, the middle rail opening still remains and, as such still detracts from the vehicle's appearance.

BRIEF DESCRIPTION

An automotive sliding door supported by an upper rail that eliminates the need for a middle rail opening in a vehicle body. The sliding door hangs from an upper guide member or members that support the door along its length in both an open and closed position.

In accordance with one aspect, a vehicle comprises a body having a top surface and a side surface, an opening in the side surface for accessing an interior of the vehicle defined by said body, and a sliding door for selectively providing access to the interior of the vehicle via the opening in the side surface of the body. The sliding door is supported for movement between a closed position closing said opening and an open position spaced apart from said opening by at least one upper guide member operatively connected to an upper portion of the door, the upper guide member including a main load supporting roller engaging a rail on the top surface of the body of the vehicle adjacent the side surface, the main load supporting roller configured to fully support the sliding door throughout movement between the open and closed positions.

A lower guide member can be operatively connected to a lower portion of the door and engaging a lower rail below the opening in the side surface of the body of the vehicle, the lower guide member including at least a guide element for restraining lateral movement of the lower portion of the door relative to the side surface of the body of the vehicle throughout movement between the open and closed positions. The upper guide member can further comprise an upper roller carriage including the main load supporting roller and at least one side roller for engaging with the upper rail for stabilizing lateral loads and resisting moment. The upper rail can include a flange and a web extending from said flange, and the at least one side roller engages a surface of the web. The carriage can further comprise at least a pair of opposed side rollers engaging respective opposite sides of the web of the upper rail. The at least one side roller can be supported on a bracket having a C-shape cross-section, and the bracket can surround at least a portion of the flange and at least a portion of the web of the upper rail. The main load supporting bearing can engage a top surface of the flange. At least a portion of the cross-section of the upper rail can have a T-shape, along at least a portion of its length. A pair of upper guide members can be mounted to an upper portion of the door at respective leading and trailing ends thereof, each load supporting roller of each guide member engaged with a respective upper rail on the top surface of the body of the vehicle adjacent the side surface. The upper rail can include a flange and a web extending from said flange, and wherein the upper guide member engages a surface of the flange and a surface of the web.

In accordance with another aspect, a sliding door assembly for selectively providing access to an opening in a body of an associated vehicle comprises a sliding door, an upper guide member operatively connected to an upper portion of the door for supporting the door, the upper guide member including a roller carriage having a main load supporting roller for supporting the door for sliding between an open and closed position, the main roller configured to engage an upper rail on a top surface of the associated vehicle and adapted to fully support the door throughout movement between the open and closed positions, and a lower guide member operatively connected to a lower portion of the door for guiding a lower portion of the door between the open and closed positions, the lower guide member configured to engage a lower rail below the opening in the body of the associated vehicle, the lower guide member including at least a guide element for restraining lateral movement of the lower portion of the door relative to the body panel of the associated vehicle.

The upper guide member can further comprise an upper roller carriage including the main roller and at least one side roller for engaging with the upper rail for stabilizing lateral loads and resisting moment applied to the door. The at least one side roller can be configured to engage a surface of a web of the upper rail on the top surface of the associated vehicle. The assembly can further comprise at least a pair of opposed side rollers for engaging respective opposite sides of the web of the upper rail of the associated vehicle. The at least one side roller can be supported on a bracket of the roller carriage having a C-shape cross-section, and wherein the bracket is adapted to surround at least a portion of a flange of the upper rail of the associated vehicle. The main load supporting roller can be configured to engage a top surface of the upper rail of the associated vehicle. The assembly can include a pair of upper guide members each having load supporting bearings mounted to an upper portion of the door at respective leading and trailing ends thereof, each load supporting bearing configured to engage with a respective upper rail on the top surface of the body of the associated vehicle adjacent the side surface.

In accordance with another aspect, a method of mounting a sliding door to a vehicle having a body with a top surface and a side surface, and an opening in the side surface for accessing an interior of the vehicle defined by said body the method comprises (i) supporting the door for movement between a closed position closing said opening and an open position spaced apart from said opening at least one upper guide member operatively connected to an upper portion of the door, the upper guide member including a main load supporting bearing engaging an upper rail on the top surface of the body of the vehicle adjacent the side surface, the upper guide member configured to fully support the weight of the door throughout movement between the open and closed positions, and (ii) guiding a lower portion of the door with a lower guide member, said lower guide member configured to engage a lower rail below the opening in the side surface to thereby restrain lateral movement of the lower portion of the door throughout movement between the open and closed positions.

BRIEF DESCRIPTION OF THE DRAWINGS

FIG. 3 is a top view of the upper rails and guide members of the sliding door in a closed position;

FIG. 4 is a top view of the upper rails and guide members of the sliding door in an open position;

FIG. 5 is the same as FIG. 3 but with the door removed to expose the lower rail and lower guide member;

FIG. 6 is the same as FIG. 4 but with the door removed to expose to lower rail and lower guide member;

DETAILED DESCRIPTION

Figure 1:
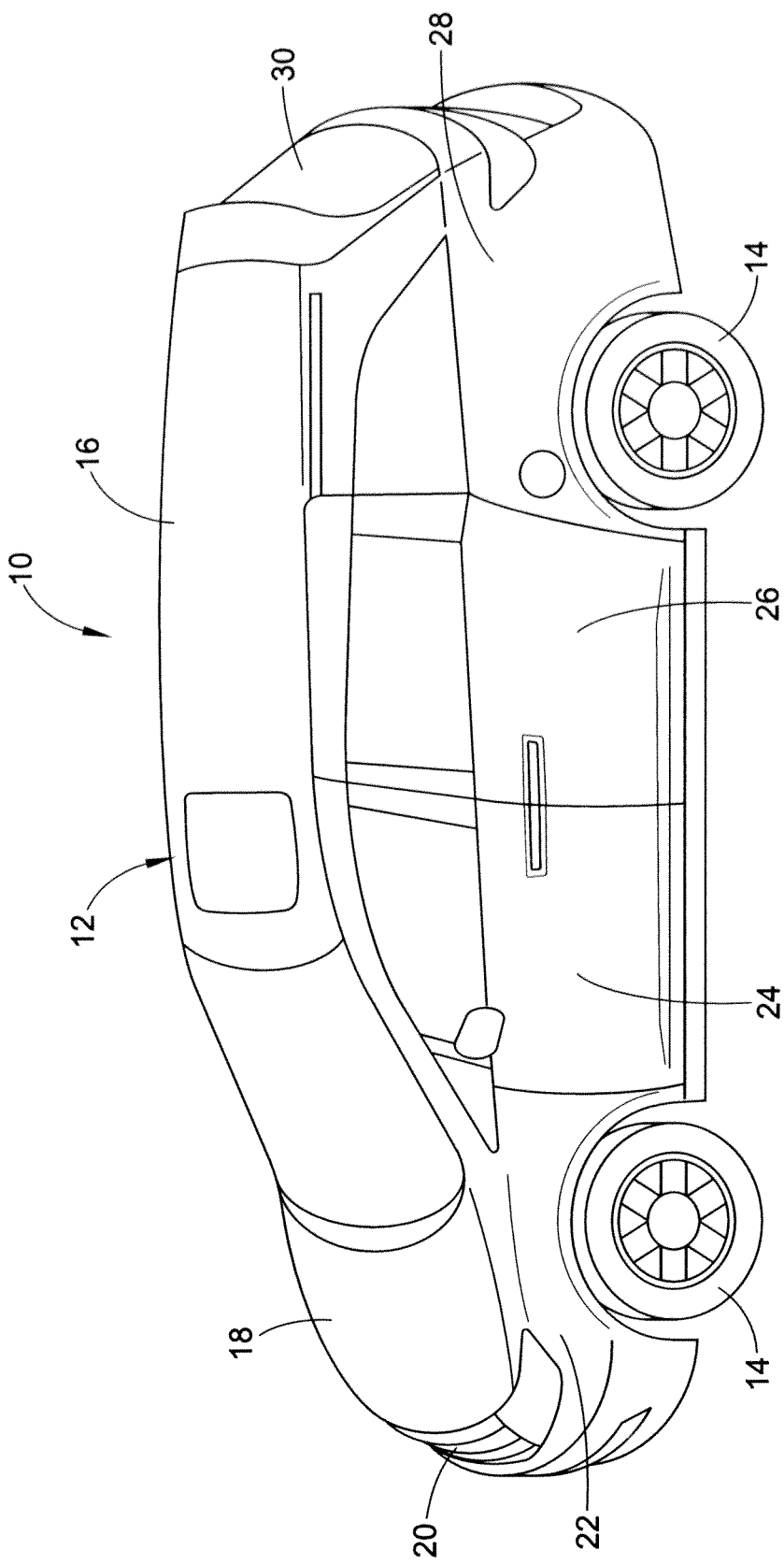
FIG. 1 is a perspective view of an exemplary vehicle including a sliding door in accordance with the disclosure.
Figure 2:
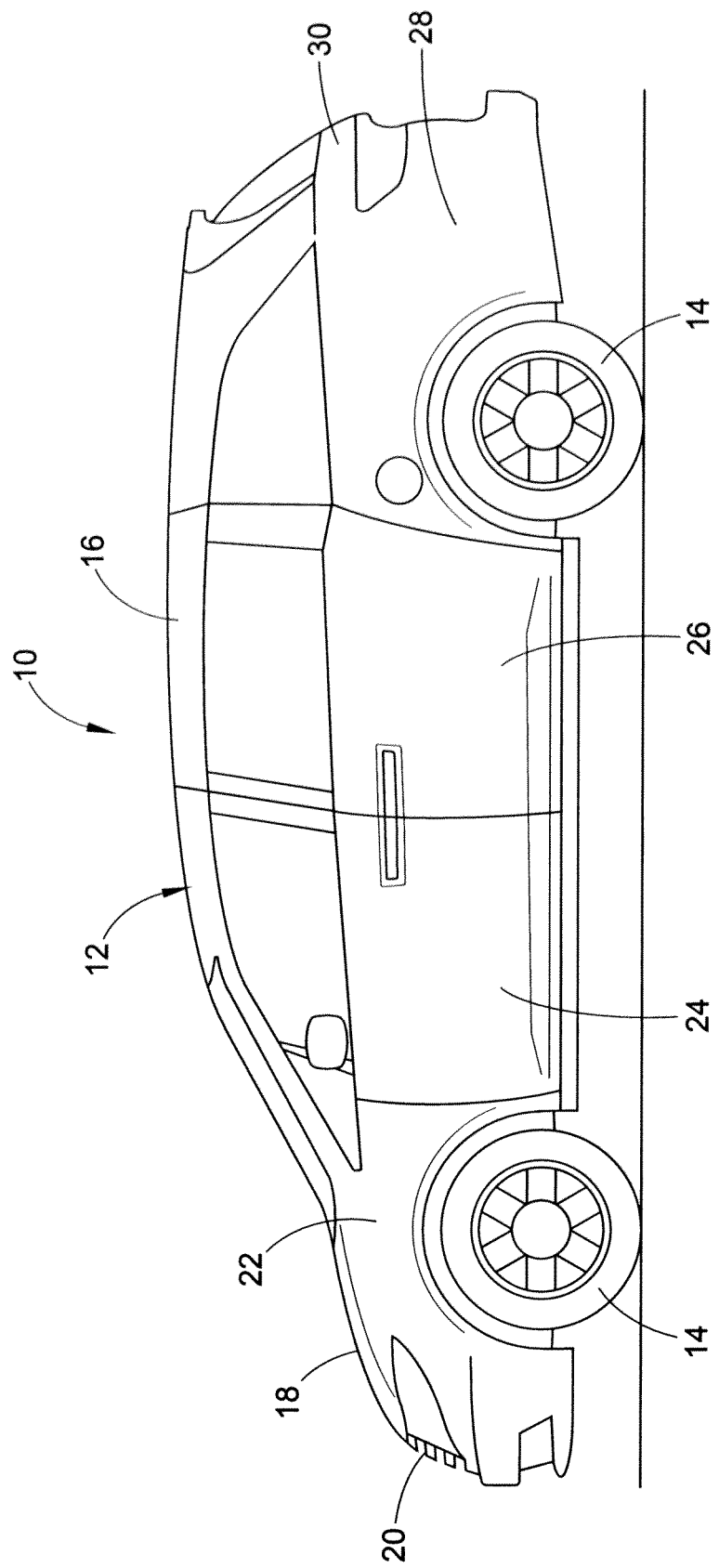
FIG. 2 is a side view of the vehicle of FIG. 1.

With reference to FIGS. 1 and 2, an exemplary vehicle 10 in accordance with the disclosure is illustrated. The vehicle 10 includes a body 12, supported on a frame, and four wheels 14 for supporting the frame and body 12 for movement over the ground. The body 12 is comprised of a plurality of body panels, windows and doors, including roof 16, hood 18, grill 20, driver side fender 22, driver door 24, driver side sliding passenger door 26 for opening and closing an opening in the body 27, driver side quarter panel 28, and liftgate 30. Although only the left side of the vehicle 10 is shown in FIG. 1, it will be appreciated that similar corresponding body panels exist on the passenger side of the vehicle as well.

The illustrated vehicle is a passenger vehicle in the form of a minivan or the like wherein the provision of rear passenger sliding doors are common. Such doors generally provide a larger access opening to the interior of the vehicle and can be easier to operate than traditional hinged doors. Sliding doors also are relatively low profile allowing the door to be opened/closed with minimal clearance to adjacent objects. The illustrated sliding door can be a manually operated door, or can be a powered door that is configured to automatically open and/or close on command.

The sliding passenger door 26 of the illustrated exemplary vehicle 10 is supported for forward/rearward movement between an open and closed position by upper guide members (not shown in FIGS. 1 and 2) engaged with upper rails 34 that are situated in respective roof channels 36. Upper rails 34 and/or roof channels 36 are generally not visible unless viewing the vehicle from an elevated position. The upper rails 34 are also recessed within the roof channels 36 such that they do not protrude above the roof surface. As will be appreciated, a suitable latching mechanism can be provided for securing and/or locking the door in the closed position.

As will be appreciated, the passenger door 26 does not have a middle rail and, thus, quarter panel 30 does not have a channel or gash like prior art vehicles. In fact, quarter panel 30 could be a continuous flat panel from bottom to top. Accordingly, the vehicle 10 as viewed from the side in FIGS. 1 and 2 has a more seamless appearance than prior art vehicles employing a typical three-rail sliding passenger door, yet still affords all of the benefits and convenience of a traditional sliding door.

Turning to FIGS. 3 and 4, upper guide members, in the form of upper roller carriages 40, are illustrated supporting the sliding door 26 in a closed position (FIG. 3) and an open position (FIG. 4). The upper roller carriages 40 are engaged with and configured to travel along upper rails 34. Upper rails 34 are generally straight along a major portion of their length, and curve inboard at their forward ends. Thus, as the door 26 is opened (i.e., moved from the position of FIG. 3 to the position of FIG. 4), the upper roller carriages 40 guide the door 26 outwardly from the side of the vehicle and in parallel fashion rearwardly along the quarter panel 28. As will be described in more detail below, upper roller carriages 40 support essentially all of the weight of the door 26, and also function to resist moment forces applied to the door 26.

The upper roller carriages 40 and upper rails 34 are configured to fully support the weight of the door. In addition, because the upper rails 34 are offset laterally from the center of gravity of the door, the moment due to gravity acting on the mass of the door is also resisted by the upper rails 34. In essence, the door 26 hangs or is otherwise suspended in a cantilevered fashion from the roller carriages 40 and upper rails 34. The manner in which the upper roller carriages 40 support these loads is set forth in more detail below.

In FIGS. 5 and 6, the door 26 has been removed for illustrating a lower rail 44 and lower guide member 48 that guides the bottom portion of the door 26 between the open (FIG. 5) and closed (FIG. 6) positions. The lower guide member 48 is adapted to restrict lateral movement of the door 26 towards and away from the side of the vehicle during opening and closing. In the illustrated embodiment, the lower guide member 48 does not support any weight of the door 26, since upper roller carriages 40 are configured to fully support the door 26. It will be appreciated, however, that the lower guide member 48 could be configured to support some of the weight of the door 26, depending on the specific application, to thereby lessen the loads applied to the upper rails 34.

Lower rail 44 has a profile similar to the upper rails 34 wherein the forward end of the rail 44 is curved inboard. This of course allows the door 26 to close/seal flush with adjacent body components when in the closed position, and to shift outwardly from the vehicle body 12 such that it can be slid rearwardly parallel to the quarter panel 28 to the open position.

Figure 7:
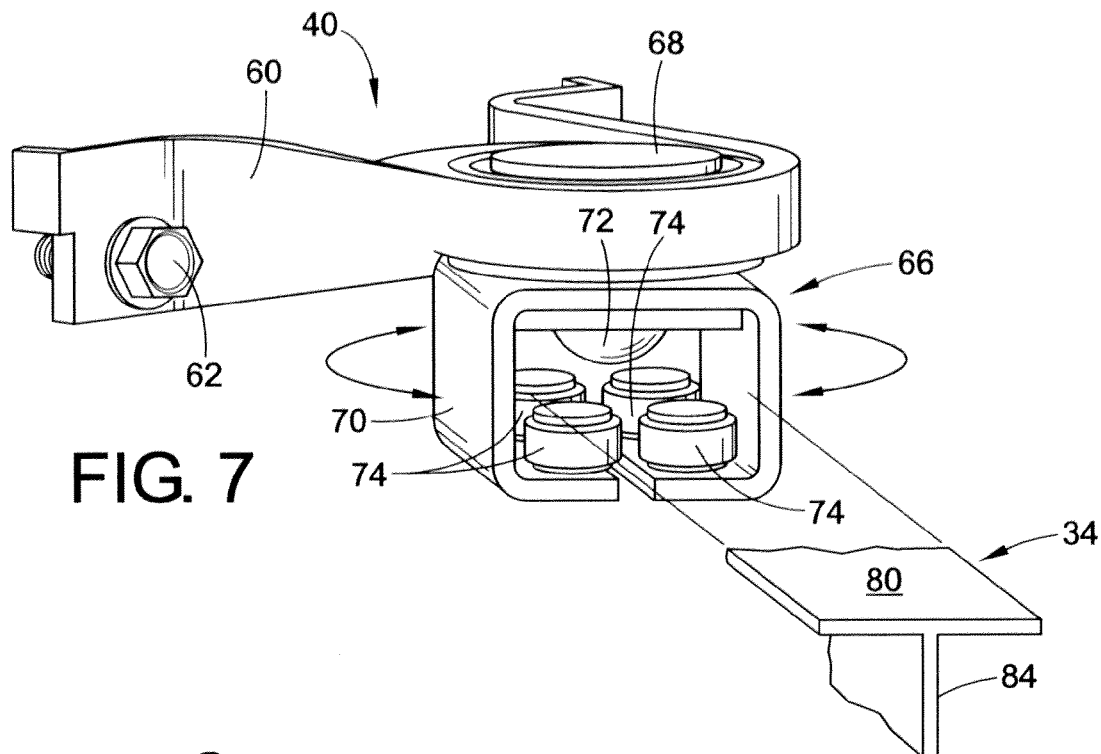
FIG. 7 is a perspective view of an exemplary upper guide member.

In FIG. 7, an exemplary upper roller carriage 40 is illustrated. The upper roller carriage 40 includes a main support bracket 60 securable to the door 26 by suitable fasteners, such as bolts 62 or the like. A roller assembly 66 is pivotally secured to the main support bracket 60 by a bearing 68 that allows relative rotation between the roller assembly 66 and the bracket 60. The roller assembly 66 includes a roller bracket 70 supporting a main load bearing roller 72 for supporting vertical loads applied to the door 26, and four side rollers 74 for supporting the lateral loads and/or moments applied to the door 26.

The main load bearing roller 74 is adapted to engage and travel upon a flange surface 80 of the rail 34. The side rollers 74 engage surfaces of a web 84 of rail 34. Specifically, two pairs of laterally spaced-apart side rollers are configured to engage respective sides of the web 84 and are operative to transfer lateral loads and/or moments, applied to the door, to the rail 34. As will be appreciated the rail 34 can be a T-shape or I-shape in cross-section. Other style rails can also be used. As compared to conventional rails, the upper rails 34 may be more robust to accommodate the increased loading associated with supporting the full weight of the door.

Figure 8:
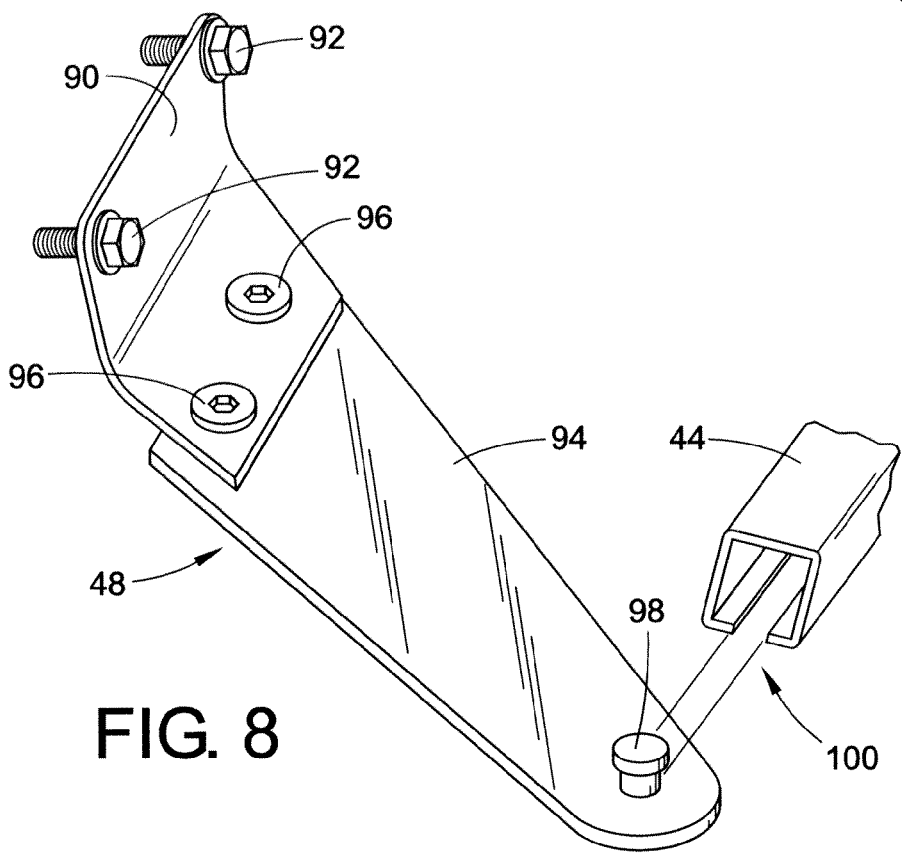
FIG. 8 is a perspective view of an exemplary lower guide member.

In FIG. 8, an exemplary lower guide member 48 includes a mounting bracket 90 securable to door 26 via fasteners 92. A support arm 94 including guide pin 94 is connected to the mounting bracket 90 by a pair of fasteners, in this instance hex socket bolts 96. Hex socket bolts 96 may be received in slots in the support arm 94 for facilitating lateral adjustment of the door 26 to ensure smooth gliding of the door 26 between its open and closed positions. Guide pin 98 is configured to be received in a slot 100 of the lower rail 44 that restrains lateral movement of the guide pin 98 and, thus, the bottom portion of the door 26. Guide pin 98 can include a bushing (not shown) for reducing friction between the lower rail 44 and the guide pin 98. Alternatively, a roller or the like could be used in place of the pin 98.

While the lower guide member 48 in the exemplary embodiment is not configured to support any weight of the door, it will be appreciated that other guide member designs could be employed to support at least some of the load of the door. In one example, the lower guide member can be configured to support the door in the event that an excess load is placed on the door, such as might occur if a user attempted to hang on the door. In such an arrangement, the upper guide members could be configured to support the entire load of the door under normal conditions, and the lower guide member could be configured to provide additional support if the load of the door is increased beyond a certain threshold.

As will now be appreciated, the present disclosure sets forth an automotive sliding door supported by an upper rail that eliminates the need for a middle rail opening in a vehicle body. The sliding door hangs from an upper guide member or members that support the door along its length in both an open and closed position. The upper guide members support the full weight of the door without a middle rail for support thereby eliminating the rail gash in rear quarter panels associated with prior art designs.

By eliminating the middle rail, the body side flange of the vehicle can be reduced, eliminating the bulge where the center rail would have otherwise curved into the body. This can allow easier access to any 3rd row of the vehicle, and can make the actual door opening larger.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle comprising:
a body having an exterior top surface comprising a roof and a side surface extending from an edge of the roof;
an opening in the side surface for accessing an interior of the vehicle defined by said body; and
a sliding door for selectively providing access to the interior of the vehicle via the opening in the side surface of the body;
wherein the sliding door is supported for movement between a closed position closing said opening and an open position spaced apart from said opening by at least one upper guide member operatively connected to an upper portion of the door, the upper guide member including a main load supporting roller engaging a rail on the exterior top surface of the body of the vehicle adjacent the side surface, the main load supporting roller configured to fully support the sliding door throughout movement between the open and closed positions.

2. A vehicle as set forth in claim 1, further comprising a lower guide member operatively connected to a lower portion of the door and engaging a lower rail below the opening in the side surface of the body of the vehicle, the lower guide member including at least one guide element for restraining lateral movement of the lower portion of the door relative to the side surface of the body of the vehicle throughout movement between the open and closed positions.

3. A vehicle as set forth in claim 1, wherein the upper guide member further comprises an upper roller carriage including the main load supporting roller and at least one side roller for engaging with the upper rail for stabilizing lateral loads and resisting moment.

4. A vehicle as set forth in claim 3, wherein the upper rail includes a flange and a web extending from said flange, and wherein said main load supporting roller is configured to roll along the flange, and said at least one side roller engages and is configured to roll along a surface of the web.

5. A vehicle as set forth in claim 4, further comprising at least a pair of opposed side rollers engaging respective opposite sides of the web of the upper rail.

6. A vehicle as set forth in claim 4, wherein the at least one side roller is supported on a bracket having a C-shape cross-section, and wherein the bracket surrounds at least a portion of the flange and at least a portion of the web of the upper rail.

7. A vehicle as set forth in claim 4, wherein the main load supporting bearing engages a top surface of the flange.

8. A vehicle as set forth in claim 1, wherein at least a portion of the cross-section of the upper rail has a T-shape, along at least a portion of its length.

9. A vehicle as set forth in claim 1, further comprising a pair of upper guide members mounted to an upper portion of the door at respective leading and trailing ends thereof, each load supporting roller engaged with a respective upper rail on the top surface of the body of the vehicle adjacent the side surface.

10. A vehicle as set forth in claim 1, wherein the upper rail includes a flange and a web extending from said flange, and wherein the upper guide member engages a surface of the flange and a surface of the web.

11. A sliding door assembly for selectively providing access to an opening in a body of an associated vehicle comprising:
a sliding door;
an upper guide member operatively connected to an upper portion of the door for supporting the door, the upper guide member including a roller carriage having a main load supporting roller for supporting the door for sliding between an open and closed position, the main roller configured to engage an exterior upper rail on a roof of the associated vehicle and adapted to fully support the door throughout movement between the open and closed positions; and a lower guide member operatively connected to a lower portion of the door for guiding a lower portion of the door between the open and closed positions, the lower guide member configured to engage a lower rail below the opening in the body of the associated vehicle, the lower guide member including at least one guide element for restraining lateral movement of the lower portion of the door relative to the body panel of the associated vehicle.

12. A sliding door assembly as set forth in claim 11, wherein the upper guide member further comprises an upper roller carriage including the main roller and at least one side roller for engaging with the upper rail for stabilizing lateral loads and resisting moment applied to the door.

13. A sliding door assembly as set forth in claim 12, wherein said at least one side roller is configured to engage and roll along a surface of a web of the upper rail on the top surface of the associated vehicle.

14. A sliding door assembly as set forth in claim 13, further comprising at least a pair of opposed side rollers for engaging respective opposite sides of the web of the upper rail of the associated vehicle.

15. A sliding door assembly as set forth in claim 13, wherein the at least one side roller is supported on a bracket of the roller carriage having a C-shape cross-section, and wherein the bracket is adapted to surround at least a portion of a flange of the upper rail of the associated vehicle.

16. A sliding door assembly as set forth in claim 11, wherein the main load supporting roller is configured to engage a top surface of the upper rail of the associated vehicle.

17. A sliding door assembly as set forth in claim 11, further comprising a pair of upper guide members including load supporting bearings mounted to an upper portion of the door at respective leading and trailing ends thereof, each load supporting bearing configured to engage with a respective upper rail on the top surface of the body of the associated vehicle adjacent the side surface.

18. A method of mounting a sliding door to a vehicle having a body with an exterior top surface comprising a roof and a side surface extending from an edge of the roof, and an opening in the side surface for accessing an interior of the vehicle defined by said body the method comprising:

supporting the door for movement between a closed position closing said opening and an open position spaced apart from said opening at least one upper guide member operatively connected to an upper portion of the door, the upper guide member including a main load supporting bearing engaging an upper rail on the exterior top surface of the body of the vehicle adjacent the side surface, the upper guide member configured to fully support the weight of the door throughout movement between the open and closed positions; and guiding a lower portion of the door with a lower guide member, said lower guide member configured to engage a lower rail below the opening in the side surface to thereby restrain lateral movement of the lower portion of the door throughout movement between the open and closed positions.

19. A method as set forth in claim 18, wherein the supporting includes mounting the door to first and second upper rails with first and second roller carriages adapted to travel along the first and second rails to move the door between the open and closed positions.

20. A method as set forth in claim 18, further comprising providing at least one side roller on the guide member for engaging with the upper rail for stabilizing lateral loads and resisting moment applied to the door.

* * * * *